United States Patent
Kosuge et al.

(10) Patent No.: US 12,507,962 B2
(45) Date of Patent: Dec. 30, 2025

(54) INFORMATION PROCESSING DEVICE, INFORMATION PROCESSING METHOD, AND STORAGE MEDIUM

(71) Applicant: NIHON KOHDEN CORPORATION, Tokyo (JP)

(72) Inventors: Minori Kosuge, Tokorozawa (JP); Kiyoshi Takeda, Tokorozawa (JP); Nanami Yamamoto, Tokorozawa (JP); Keita Imai, Tokorozawa (JP)

(73) Assignee: NIHON KOHDEN CORPORATION, Tokyo (JP)

( * ) Notice: Subject to any disclaimer, the term of this patent is extended or adjusted under 35 U.S.C. 154(b) by 368 days.

(21) Appl. No.: 18/181,916

(22) Filed: Mar. 10, 2023

(65) Prior Publication Data

US 2023/0301602 A1 Sep. 28, 2023

(30) Foreign Application Priority Data

Mar. 23, 2022 (JP) ................................. 2022-046376

(51) Int. Cl.
*A61B 5/00* (2006.01)

(52) U.S. Cl.
CPC .............. *A61B 5/7275* (2013.01); *A61B 5/74* (2013.01)

(58) Field of Classification Search
CPC ................................. A61B 5/7275; A61B 5/74
See application file for complete search history.

(56) References Cited

U.S. PATENT DOCUMENTS

| | | | |
|---|---|---|---|
| 2017/0004258 A1 | 1/2017 | Wang et al. | |
| 2022/0005571 A1 | 1/2022 | Ogawa et al. | |
| 2023/0020331 A1* | 1/2023 | Muse | G16H 40/67 |
| 2023/0157552 A1* | 5/2023 | Thuering | A61B 5/4848 |
| | | | 600/301 |

FOREIGN PATENT DOCUMENTS

| | | |
|---|---|---|
| JP | 2017-503569 A | 2/2017 |
| JP | 2020-160597 A | 10/2020 |
| JP | 7177540 B1 | 11/2022 |

OTHER PUBLICATIONS

Japanese Office Action issued in Japanese Patent Application No. 2022-046376 dated Jun. 24, 2025.

* cited by examiner

*Primary Examiner* — Tammie K Marlen
(74) *Attorney, Agent, or Firm* — McDonald Hopkins LLC

(57) ABSTRACT

An information processing device includes an acquisition unit configured to acquire subject information including at least one of information about a patient and information bout a medical practitioner, measurement information about a physiological parameter of the patient, and prediction information about the physiological parameter of the patient predicted by the medical practitioner, an analyzing unit configured to analyze a relationship between the subject information and a degree of divergence between the prediction information and the measurement information, and an output that configured to output analysis information representing the relationship between the subject information and the degree of divergence.

15 Claims, 9 Drawing Sheets

DOCTOR A  PATIENT B

|  | AUGUST 31ST | SEPTEMBER 1ST | SEPTEMBER 2ND | SEPTEMBER 3RD | ... |
|---|---|---|---|---|---|
|  | 7:00 | 7:00 | 7:00 | 7:00 | ... |
| PREDICTED VALUE |  |  |  |  |  |
| ART |  | 110 | 115 | 115 |  |
| CVP |  | 3 | 5 | 6 |  |
| PaO2 |  | 50 | 55 | 55 |  |
| PaCO2 |  | 80 | 70 | 60 |  |
| MEASURED VALUE |  |  |  |  |  |
| ART | 95 | 102 | 105 | 110 |  |
| CVP | 2 | 2 | 2 | 4 |  |
| PaO2 | 35 | 40 | 42 | 45 |  |
| PaCO2 | 95 | 89 | 80 | 76 |  |
| DIFFERENCE |  |  |  |  |  |
| ART |  | +8 | +10 | +5 |  |
| CVP |  | +1 | +3 | +2 |  |
| PaO2 |  | +10 | +13 | +10 |  |
| PaCO2 |  | −9 | −10 | −16 |  |

FIG. 6A

|  | CATEGORY 2 | CATEGORY 3 |
|---|---|---|
| ART(24H) | −7 (−12～+8) | +2 (−12～+12) |
| CVT(24H) | 0 (−1～+1) | 0 (−1～+1) |
| PaO2(24H) | −1 (−5～+5) | +1 (−5～+5) |
| PaCO2(24H) | −10 (−12～−8) | 0 (−2～+2) |
| ART(72H) | −7 (−12～+8) | +7 (−10～+14) |
| CVT(72H) | 2 (0～+5) | 0 (−1～+1) |
| PaO2(72H) | 1 (−2～+4) | −1 (−2～0) |
| PaCO2(72H) | 0 (−2～+2) | 0 (−2～+2) |

FIG. 6B

|  | CATEGORY 2 | CATEGORY 3 |
|---|---|---|
| PATIENT (40'S) | EVALUATION A | EVALUATION B |
| PATIENT (60'S) | EVALUATION B | EVALUATION A |

FIG. 9A

| | ARDS WITH CHRONIC DISEASE | ARDS WITH NO CHRONIC DISEASE | AFTER SURGERY (OTHER THAN HEART AND LUNG) | AFTER SURGERY (HEART) | AFTER SURGERY (LUNG) | Covid 19 |
|---|---|---|---|---|---|---|
| PATIENT (40'S OR UNDER) | EVALUATION C | EVALUATION D | EVALUATION A | EVALUATION C | EVALUATION C | EVALUATION D |
| PATIENT (50'S) | EVALUATION C | EVALUATION D | EVALUATION A | EVALUATION D | EVALUATION C | EVALUATION E |
| PATIENT (60'S) | EVALUATION C | EVALUATION D | EVALUATION A | EVALUATION D | EVALUATION C | EVALUATION E |
| PATIENT (70'S OR MORE) | EVALUATION D | EVALUATION D | EVALUATION B | EVALUATION D | EVALUATION D | EVALUATION D |

FIG. 9B

| | ARDS WITH CHRONIC DISEASE | ARDS WITH NO CHRONIC DISEASE | AFTER SURGERY (OTHER THAN HEART AND LUNG) | AFTER SURGERY (HEART) | AFTER SURGERY (LUNG) | Covid 19 |
|---|---|---|---|---|---|---|
| INTENSIVE CARE PHYSICIAN | EVALUATION C | EVALUATION C | EVALUATION A | EVALUATION B | EVALUATION B | EVALUATION D |
| SURGEON | EVALUATION E | EVALUATION D | EVALUATION E | EVALUATION A | EVALUATION B | EVALUATION E |

INFORMATION PROCESSING DEVICE, INFORMATION PROCESSING METHOD, AND STORAGE MEDIUM

CROSS-REFERENCE TO RELATED APPLICATIONS

This application is based upon and claims the benefit of priority from Japanese Patent Application No. 2022-046376, filed Mar. 23, 2022, the entire contents of which are incorporated herein by reference.

TECHNICAL FIELD

The present invention relates to an information processing device, an information processing method, and a storage medium.

BACKGROUND ART

In medical institutions such as hospitals, for example, changes over time in the physiological parameters of patients, such as heart rate are measured (Japanese Unexamined Patent Application Publication (Translation of PCT Application) No. 2017-503569, and the like). A medical practitioner such as a doctor predicts the patient's future condition and treats each patient while checking the change in the physiological parameters, for example.

SUMMARY

The accuracy of predicting changes in physiological parameters varies depending on the patient's age, disease, and the like, and varies depending on the clinical department, years of experience, and the like of the medical practitioner. By grasping such a tendency in prediction accuracy, medical institutions can provide more appropriate treatment for each patient.

Accordingly, an object of the presently disclosed subject matter is to provide an information processing device, an information processing method, and a program capable of grasping the tendency of prediction accuracy of physiological parameters.

The above problems of the presently disclosed subject matter are solved by the following means.

According to an aspect of the presently disclosed subject matter, there is provided an information processing device including an acquisition unit configured to acquire subject information including at least one of information about a patient and information about a medical practitioner, measurement information about a physiological parameter of the patient, and prediction information about the physiological parameter of the patient predicted by the medical practitioner, an analyzing unit configured to analyze a relationship between the subject information and a degree of divergence between the prediction information and the measurement information, and an output that configured to output analysis information representing the relationship between the subject information and the degree of divergence.

BRIEF DESCRIPTION OF DRAWINGS

FIG. 4 is a diagram illustrating an example of a screen displayed on a display illustrated in FIG. 3;

FIGS. 6A and 6B are diagrams illustrating an example of analysis information output from an output illustrated in FIG. 4;

FIGS. 9A and 9B are diagrams illustrating an example of analysis information output from the central monitor illustrated in FIG. 8;

DESCRIPTION OF EMBODIMENTS

Figure 1:
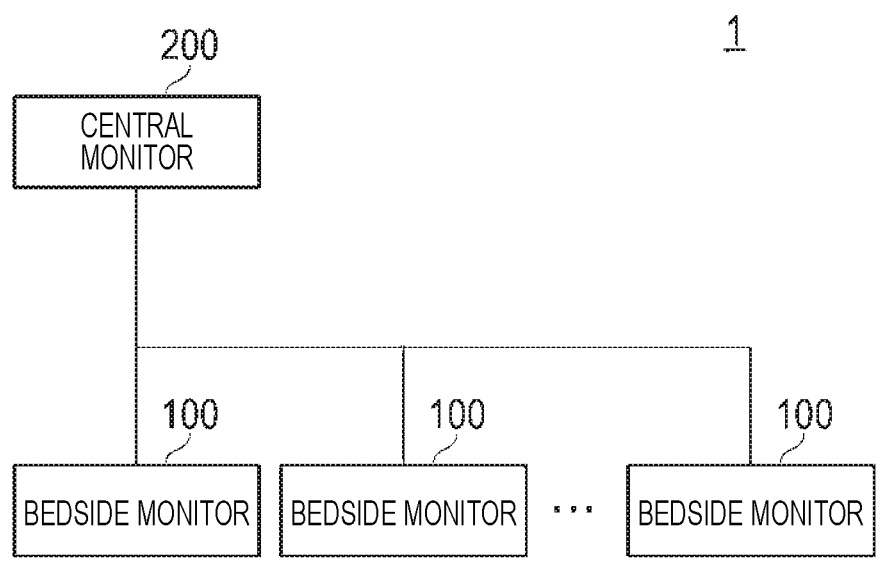
FIG. 1 is a diagram illustrating an example of the overall configuration of an information processing system according to one embodiment of the presently disclosed subject matter.

Hereinafter, an information processing device and an information processing system according to an embodiment of the presently disclosed subject matter will be described in detail with reference to the drawings. In the drawings, the same elements are denoted by the same reference numerals, and a redundant description is omitted.

Embodiment

[Configuration of Information Processing System 1]

FIG. 1 is a schematic configuration diagram of an information processing system 1. The information processing system 1 may include, for example, a bedside monitor 100 and a central monitor 200. The central monitor 200 and the bedside monitor 100 are communicably connected to each other via a wired or wireless network. The network is, for example, a Local Area Network (LAN), a Wide Area Network (WAN), or the like. For example, Ethernet (registered trademark), Wi-Fi (registered trademark), Bluetooth (registered trademark), or 5G can be used as the network communication standard. For example, a plurality of bedside monitors 100 are connected to one central monitor 200. Here, the central monitor 200 corresponds to a specific example of the information processing device of the presently disclosed subject matter.

(Bedside Monitor 100)

Figure 2:
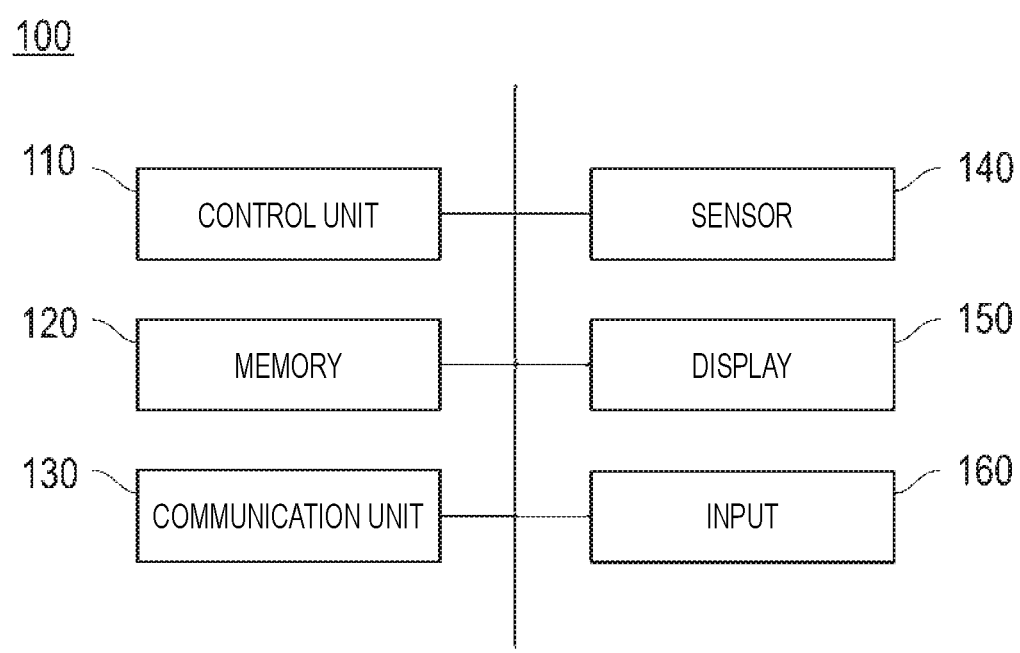
FIG. 2 is a block diagram illustrating an example of the configuration of a bedside monitor illustrated in FIG. 1.

FIG. 2 is a block diagram of the hardware configuration of the bedside monitor 100. The bedside monitor 100 may include, for example, a control unit 110, a memory 120, a communication unit 130, a sensor 140, a display 150, and an input 160. These components are interconnected by buses. Some components may be connected to the bus by wireless communication. The bedside monitor 100 may be provided, for example, for each patient's bed, or for each patient's room.

The control unit 110 is composed of, for example, a Central Processing Unit (CPU) and a Random Access Memory (RAM), controls each component of the bedside monitor 100 and performs various calculations. The control unit 110 transmits physiological parameters measured by the sensor 140 to the central monitor 200 through the communication unit 130. The physiological parameters measured by the sensor 140 are, for example, parameters related to the heart, blood pressure, respiration, circulation, brain, body temperature, blood, and the like, and, specifically, heart rate (HR), arterial blood oxygen saturation (SpO2), non-invasive blood pressure (NIBP), respiratory rate (rRESP), invasive blood pressure (ART), central venous pressure (CVP), regional cerebral oxygen saturation (rSO2), inspiratory oxygen concentration (FiO2), exhaled carbon dioxide partial pressure (RR(CO2)), end-expiratory carbon dioxide partial pressure (etCO2), arterial oxygen partial pressure (PaO2), arterial blood carbon dioxide partial pressure (PaCO2), P/F ratio (P/F Ratio), acidity (PH), continuous cardiac output (CCO), body temperature, and the like.

When an abnormality is detected in the physiological parameter measured by the sensor 140, the control unit 110 may transmit an alarm notifying of the abnormality to the central monitor 200 via the communication unit 130. Abnormalities notified by the alarm include, for example, abnormalities in measured physiological parameters, abnormalities in devices including measuring equipment (devices and elements) that constitute the sensor 140, abnormalities in the attachment state, such as when the sensor 140 attached to the patient is removed, and abnormalities in the measurement environment such as radio wave interruptions and noise mixing.

The control unit 110 transmits measurement information regarding the physiological parameters of each patient measured by the sensor 140, to the central monitor 200. This measurement information is associated, for example, with identifying information identifying the patient. The identifying information includes, for example, the patient's bed number, the patient's ID, the IP address of the bedside monitor 100, and the like.

The memory 120 is configured by, for example, an SSD (Solid State Drive), and stores various programs including an operating system and various data.

The communication unit 130 is an interface for communicably connecting the bedside monitor 100 and the central monitor 200. The communication unit 130 can be configured by, for example, an input terminal, an antenna, a front-end circuit, and the like.

The sensor 140 is a device or element that detects a physiological parameter. The sensor 140 may include, for example, an electrocardiogram measurement electrode, a SpO2 probe, and the like. The bedside monitor 100 may include a plurality of sensors 140. The sensor 140 may be configured to be detachable from the bedside monitor 100.

The display 150 displays (outputs) the patient's physiological parameters measured by the sensor 140 in a visually perceptible manner. The physiological parameters are displayed on the display 150 as numerical values, waveforms, graphs, and the like, for example. The display 150 may be configured by, for example, a liquid crystal display.

The input 160 receives various inputs from the user. For example, medical practitioners such as doctors and nurses input various information into the bedside monitor 100 via the input 160. The input 160 is configured by, for example, operation buttons, a mouse, a keyboard, or the like. The display 150 and the input 160 may be configured integrally and may be configured by a touch panel type display or the like, for example.

(Central Monitor 200)

Figure 3:
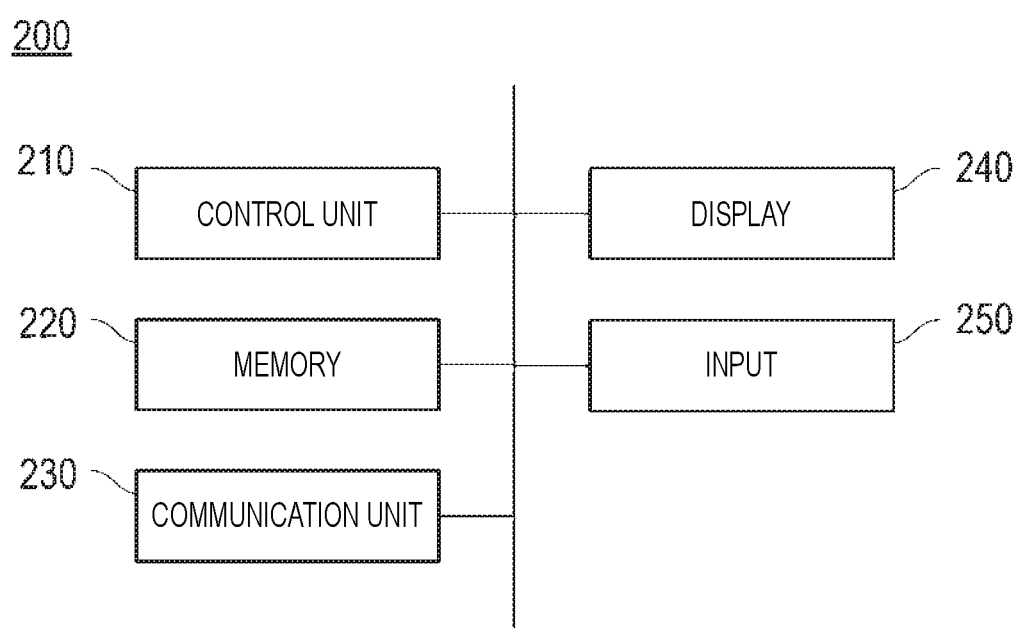
FIG. 3 is a block diagram illustrating an example of the configuration of a central monitor illustrated in FIG. 1.

FIG. 3 is a block diagram of a hardware configuration of the central monitor 200. The central monitor 200 may include a control unit 210, a memory 220, a communication unit 230, a display 240, and an input 250. These components are interconnected by buses. Since the basic configuration of these components is the same as the basic configuration of the corresponding components of the bedside monitor 100, a redundant description will be omitted. The central monitor 200 is configured, for example, to be able to aggregate and display the physiological parameters of a plurality of patients received from each bedside monitor 100 and is arranged at a nurse station or the like.

The control unit 210 receives, from each bedside monitor 100, the measurement information regarding the patient's physiological parameters measured by the sensor 140 and the patient's identifying information through the communication unit 230. A specific function of the control unit 210 will be described later. The control unit 210 may receive an alarm from each bedside monitor 100 and output alarm information regarding this alarm to the display 240 or the like.

The memory 220 stores the measurement information and the identifying information in association with the received time. The measurement information can be stored in association with identifying information. In addition, the memory 220 stores prediction information related to a patient's physiological parameters predicted by a medical practitioner such as a doctor. The prediction information is input by the medical practitioner through the input 250, for example. The medical practitioner inputs the prediction information based, for example, on the current patient's condition. The medical practitioner may refer to the values of the patient's current physiological parameters measured by the sensor 140 to enter the prediction information.

FIG. 4 shows an example of a screen (screen 241) on which prediction information is displayed. On the screen 241, the prediction information obtained by predicting each physiological parameter of Patient B by Doctor A who is a medical practitioner is displayed. Based on Patient B's ART, CVP, PaO2, and PaCO2 values measured by the sensor 140 at 7:00 on August 31st, Doctor A predicts Patient B's ART, CVP, PaO2, and PaCO2 at 7:00 on September 1st, 7:00 on September 2nd, and 7:00 on September 3rd. That is, Doctor A has input prediction information (predicted values) regarding the physiological parameters of Patient B 24 hours, 48 hours, and 72 hours after the reference date and time of 7:00 on August 31. For example, the screen 241 displays measurement information related to the physiological parameters of Patient B measured at the date and time corresponding to this prediction information (hereinafter, referred to as the prediction date and time). In FIG. 4, the values (actual values) of ART, CVP, PaO2, and PaCO2 of patient B measured by the sensor 140 at 7:00 on September 1st, 7:00 on September 2nd, and 7:00 on September 3rd are displayed.

The memory 220 may store patient information about each patient. The patient information is, for example, information about the patient's condition and history, such as the patient's sex, age, body shape, smoking history, underlying disease, medical history, height, weight, reason for hospitalization, reason for admission to an intensive care unit, disease name, medication status, onset status of pneumonia, and operation status. The memory 220 may store medical practitioner information about each medical practitioner. The medical practitioner information is, for example, information about the medical practitioner's condition, career, and the like and includes the medical practitioner's clinical department, years of experience, and the like.

The communication unit 230 is an interface for connecting to each bedside monitor 100. The central monitor 200 may be configured to be connectable to another device through the communication unit 230.

The display 240 aggregates and displays (outputs) the physiological parameters of each patient received by the control unit 210 from the plurality of bedside monitors 100. The input 250 receives various inputs from a user such as a medical practitioner. The medical practitioner inputs each patient's prediction information via the input 250. For example, the user may input a numerical value as the prediction information using a keyboard or the like or may select a predetermined position or area of a graph or the like using a mouse or the like.

Figure 5:
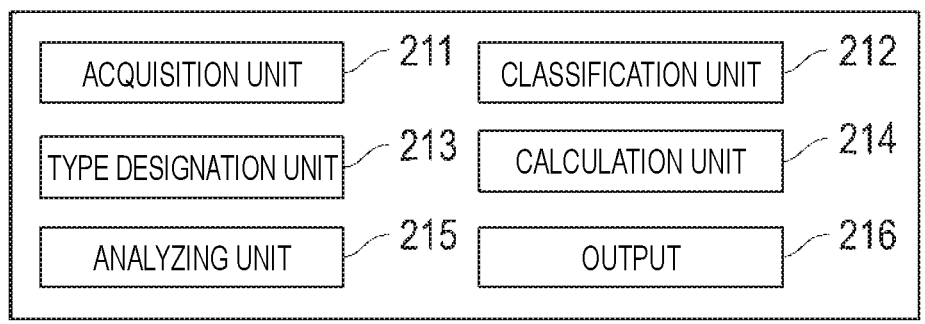
FIG. 5 is a block diagram illustrating an example of the functions of a control unit illustrated in FIG. 3.

FIG. 5 is a block diagram illustrating an example of the functional configuration of the control unit 210. In the central monitor (a computer) 200, for example, the control unit 210 reads the program stored in the memory 220 and executes processing to function as an acquisition unit 211, a classification unit 212, a type designation unit 213, a calculation unit 214, an analyzing unit 215, and an output 216. The control unit 210 may include one or more processors, for example, a Central Processing Unit (CPU), and one or more memories, for example, a Random Access Memory (RAM). The memory 220 may be configured by a non-transitory computer-readable storage medium.

The acquisition unit 211 acquires subject information, measurement information, and prediction information. The subject information includes at least one of patient information about the patient and medical practitioner information about the medical practitioner. The patient information is information related to a patient whose physiological parameters have been measured by the sensor 140, that is, the subject of the measurement information (for example, Patient B in FIG. 4). The medical practitioner information is information about the medical practitioner who predicted the future physiological parameters based on the measurement information of the subject on a predetermined date and time, that is, the predictor of the prediction information (for example, Doctor A in FIG. 4). The subject information preferably includes patient information and medical practitioner information. This increases the amount of information to be acquired, making it possible to perform analysis with higher precision.

The measurement information is, as described above, information about the patient's physiological parameters measured by the sensor 140, for example, the measured values (actual value) of the physiological parameter (see FIG. 4). The measurement information acquired by the acquisition unit 211 includes, for example, information such as measurement date and time (or measurement time). This measurement information preferably includes information about physiological parameters measured near the prediction date and time of the prediction information acquired by the acquisition unit 211.

The prediction information is, as described above, information related to the patient's physiological parameters predicted by a medical practitioner, for example, the predicted values of the physiological parameters (see FIG. 4). The prediction information acquired by the acquisition unit 211 includes, for example, information regarding the reference date and time (or reference time) or the like. The reference date and time is, for example, the date and time when the prediction information is input by the input 250. The reference date and time may be the measurement date and time of the physiological parameters of the patient that serve as the basis for the prediction. The prediction information may include information about the prediction date and time. The prediction information may be an indicator of a physiological parameter indicating the patient's future condition and may be a target value such as a clinical guideline value, for example. The guideline target value may be a guideline value of various societies or may be a value obtained by changing the guideline values of various societies by each facility.

This prediction information preferably includes information related to the prediction of changes over time in physiological parameters, for example, preferably includes first prediction information after a first time and second prediction information after a second time from the reference date and time. The first time is, for example, 24 hours and the second time is, for example, 72 hours (see FIG. 4). At this time, the measurement information preferably includes first measurement information measured after the first time and second measurement information measured after the second time from the reference date and time. That is, the measurement information acquired by the acquisition unit 211 preferably includes the first measurement information and the second measurement information measured at the prediction dates and times of the first prediction information and the second prediction information (see FIG. 4). This makes it possible to check the change over time of the degree of divergence between the measurement information and the prediction information. The prediction information may further include a plurality of pieces of prediction information for other prediction dates and times, and the measurement information may further include measurement information measured at other dates and times.

The acquisition unit 211 preferably acquires measurement information and prediction information regarding a plurality of types of physiological parameters. This increases the amount of information to be acquired, making it possible to perform analysis with higher precision.

The acquisition unit 211 acquires, for example, a plurality of pieces of subject information, a plurality of pieces of measurement information, and a plurality of pieces of prediction information. The subject information, the measurement information, and the prediction information are associated with each other based on the relationship between the patient whose physiological parameters are measured (for example, Patient B in FIG. 4) and the medical practitioner who makes the prediction (for example, Doctor A in FIG. 4).

The classification unit 212 classifies the subject information acquired by the acquisition unit 211 into a plurality of categories. The classification unit 212 classifies, for example, patient information included in each of the plurality of pieces of subject information into a plurality of categories and classifies medical practitioner information included in each of the plurality of pieces of subject information into a plurality of categories. The classification unit 212 classifies the patient information into a plurality of categories, for example, according to the patient's sex, age, body shape, smoking history, underlying disease, medical history, height, weight, reason for hospitalization, reason for admission to an intensive care unit, disease name, medication status, onset status of pneumonia, and operation status. The classification unit 212 classifies the medical practitioner information into a plurality of categories, for example, according to the medical practitioner's clinical department, years of experience, and the like.

The classification unit 212 determines categories for classifying the subject information based on instructions from the user, for example. The user inputs an instruction via the input 250, for example. This allows the user to freely determine the category according to the application. The categories may be determined in advance, and the classification unit 212 may determine the categories using statistics, machine learning, or the like. The classification unit 212 may determine categories according to numerical values, attributes, or the like included in the subject information. The numerical value is, for example, the age of the patient and the year of experience of the medical practitioner, and the attributes are the disease of the patient and the medical department of the medical practitioner.

The type designation unit 213 designates the type of physiological parameter for the measurement information and prediction information acquired by the acquisition unit 211. The type designation unit 213 designates the type of physiological parameter, for example, based on an instruction from the user. A user inputs an instruction via the input 250, for example. The acquisition unit 211 may acquire the measurement information and the prediction information regarding the type of physiological parameter designated by the type designation unit 213. By designating the type of physiological parameter, it becomes possible to perform an analysis more suited to the user's application.

The calculation unit 214 calculates the degree of divergence between the prediction information and the measurement information acquired by the acquisition unit 211. The degree of divergence is an index representing the accuracy of the prediction of a patient's physiological parameter by a medical practitioner. A large degree of divergence indicates low accuracy of prediction, and a small degree of divergence indicates high accuracy of prediction. The degree of divergence is, for example, the difference between prediction information and measurement information. When a plurality of differences can be calculated, the degree of divergence may be the median value, average value, or the like of the plurality of differences. The calculation unit 214 calculates, for example, the degree of divergence between the prediction information and the measurement information regarding the physiological parameter of the type designated by the type designation unit 213.

The calculation unit 214 calculates, for example, the degree of divergence between the prediction information at a predetermined prediction date and time and the measurement information measured at this prediction date and time. For example, the calculation unit 214 calculates the difference (+8) between the predicted value 110 of ART at 7:00 on September 1st at the prediction date and time and the measured value 102 of ART measured at 7:00 on September 1st (see FIG. 4). As described above, when the acquisition unit 211 acquires the first prediction information and the second prediction information, and the first measurement information and the second measurement information, the calculation unit 214 calculates a first degree of divergence between the first prediction information and the first measurement information and a second degree of divergence between the second prediction information and the second measurement information.

The calculation unit 214 may calculate the degree of divergence by normalizing each physiological parameter. The calculation unit 214 may weigh each physiological parameter and calculate a composite degree of divergence in which the degree of divergence of a plurality of types of physiological parameters is taken into consideration. This composite degree of divergence is calculated, for example, as follows. First, after setting the weight of the vector space for each physiological parameter, the single degree of divergence of each physiological parameter axis is calculated, and a point on the vector space is obtained from the single degree of divergence. The vector length from this point to the origin is calculated as the composite degree of divergence.

The central monitor 200 may have a function of notifying when the magnitude of the degree of divergence calculated by the calculation unit 214 exceeds a predetermined value. The function is switched on or off by user setting, for example, and this ON and OFF can be set for each physiological parameter, for example. This allows the user to set alerts only for those parameters the user wants to pay particular attention to. Further, when the magnitude of the degree of divergence of at least one physiological parameter exceeds a predetermined value, a notification may be made. Such a notification function makes it easier for the medical practitioner to notice the divergence between the prediction information and the measurement information, so that the medical practitioner can quickly take measures such as changing the treatment plan. The magnitude and threshold of the degree of divergence to be notified are set for each physiological parameter, for example.

The notification may be made, for example, by displaying a warning message on the display 240, or by changing the display method of the degree of divergence (for example, changing the color of the numerical value, changing the background color, and the like). The notification may be made by sending a warning e-mail to the terminal of the person concerned, or by emitting an alarm sound from a speaker or the like.

The analyzing unit 215 analyzes the relationship between the subject information acquired by the acquisition unit 211 and the degree of divergence calculated by the calculation unit 214. Specifically, the analyzing unit 215 analyzes the relationship between the patient information and medical practitioner information included in the subject information and the magnitude of the degree of divergence. The analyzing unit 215 analyzes the relationship between the subject information and the degree of divergence for each category of the subject information classified by the classification unit 212, for example. This makes it possible to analyze the relationship between each category of patients or medical practitioners and prediction accuracy. When the calculation unit 214 calculates a first degree of divergence and the second degree of divergence, the analyzing unit 215 analyzes the relationship between the subject information and the first degree of divergence and analyzes the relationship between the subject information and the second degree of divergence. This makes it possible to analyze the relationship between subject information and the accuracy of short-term prediction and long-term prediction.

The output 216 outputs analysis information representing the relationship between the subject information and the degree of divergence, which was analyzed by the analyzing unit 215. The output 216 outputs analysis information for each category classified by the classification unit 212, for example. By checking the analysis information, a user such as a medical practitioner can grasp the degree of prediction accuracy for each category to which the subject information belongs. The analysis information includes, for example, information on the confidence interval of the degree of divergence (for example, FIG. 6A described later).

A confidence interval is, for example, a 95% confidence interval. The analysis information may include information on graded evaluation according to the degree of divergence, that is, prediction accuracy (for example, FIG. 6B described later).

FIGS. 6A and 6B show an example of the analysis information output by the output 216. FIGS. 6A and 6B show the prediction accuracies of medical practitioners in categories 2 and 3 for physiological parameters of patients in category 1. The types of predicted physiological parameters are ART, CVP, PaO2, and PaCO2. FIG. 6A shows the degree of divergence between the prediction information and the measurement information 24 hours and 72 hours after the reference date and time for these physiological parameters. In FIG. 6A, the value outside the parentheses is the median value of the difference between the predicted information and the measurement information, and the value inside the parentheses is the 95% confidence interval of this difference. In FIG. 6B, evaluations A and B are graded evaluations according to the degree of divergence, and evaluation A has a smaller degree of divergence than evaluation B, that is, the prediction accuracy is high. The graded evaluation is made, for example, in five grades. Evaluations are determined, for example, based on median dissociation and 95% confidence intervals.

Category 1 of the patients and categories 2 and 3 of the medical practitioners are, for example, as follows.
(Category 1 of Patients)
   20 Age: Over 65 years old
   Sex: Male
   Reason for admission to intensive care unit, or the like:
      After heart surgery
   Medication status: Prescribed drug
   Underlying disease: High blood pressure
(Category 2 of Medical Practitioners)
   Clinical department: Cardiac surgeon
   Years of experience: 10 years or more
(Category 3 of Medical Practitioners)
   Clinical department: Intensive care physician
   Years of experience: 10 years or more.

In the central monitor 200 of the present embodiment, the analysis information representing the relationship between the subject information and the magnitude of the degree of divergence is output in this way, so that a user such as a medical practitioner can understand the relationship between at least one of the patient and the medical practitioner and the degree of divergence. Although the details will be described later, this makes it possible to grasp the tendency of the prediction accuracy of the physiological parameter.

The central monitor 200 may issue a notification when the degree of divergence is large in the output analysis information. The above notification may be made by, for example, displaying a warning message on the display 240, or changing the display method of the degree of divergence or category (for example, changing the color of the numerical value, changing the background color, and the like). The magnitude and threshold of the degree of the divergence to be notified are set for each physiological parameter, for example.

[Processing Method of Central Monitor 200]

Next, the analysis processing of subject information, measurement information, and prediction information by the central monitor 200, that is, the information processing method by the central monitor 200 will be described using FIG. 7 together with FIG. 6A.

Figure 7:
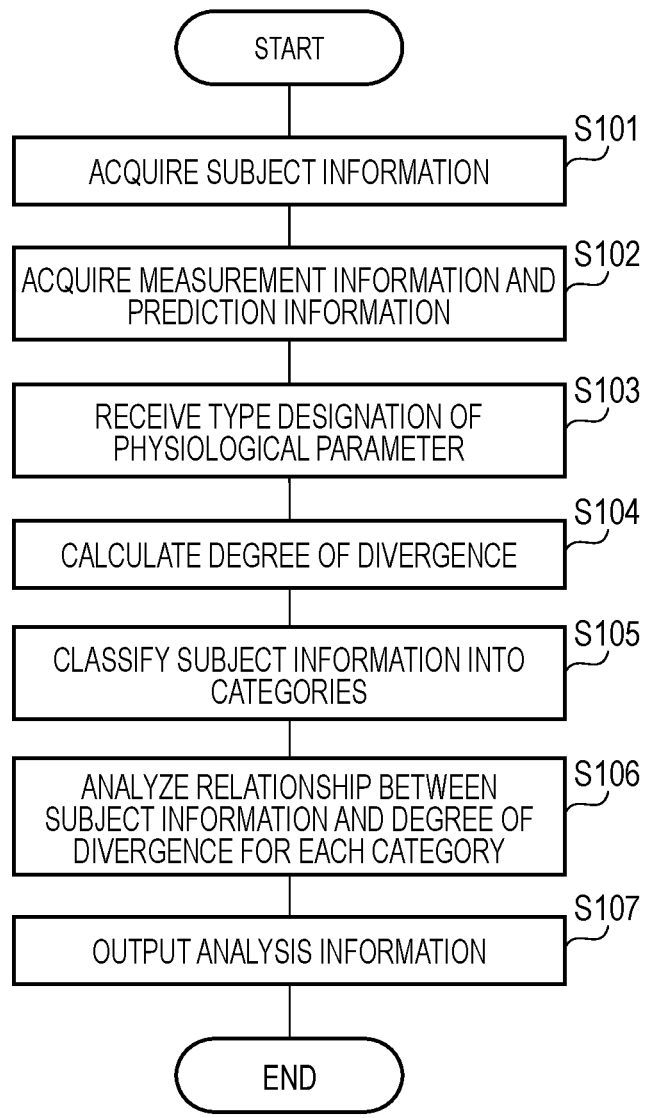
FIG. 7 is a flowchart illustrating an example of the processing of the central monitor illustrated in FIG. 1.

FIG. 7 is a flowchart illustrating the analysis processing of the central monitor 200. The flowchart can be executed by the control unit 210 of the central monitor 200 according to a program.

First, the control unit 210 acquires subject information, measurement information, and prediction information (steps S101 and S102). The control unit 210 may acquire the subject information, the measurement information, and the prediction information at the same time, or may acquire the subject information after acquiring the measurement information and the prediction information.

Next, the control unit 210 receives the designation of the type of physiological parameters (step S103). For example, the control unit 210 receives a designation of ART, CVP, PaO2, and PaCO2 from the user via the input 250 (FIG. 6A).

Next, the control unit 210 calculates the degree of divergence between the measurement information and the prediction information acquired in step S102 for the type of physiological parameter designated in step S103 (step S104). For example, the control unit 210 subtracts the measured values of ART 24 hours and 72 hours after the reference date and time from the predicted values of ART 24 hours and 72 hours after the reference date and time, respectively, and calculates the difference therebetween (FIG. 6A). When the magnitude of the degree of divergence exceeds a predetermined value, the control unit 210 notifies using the display 240, for example.

Next, the control unit 210 determines a plurality of categories and classifies the subject information into the plurality of categories (step S105). For example, the control unit 210 classifies the patient information according to age, sex, reason for admission to an intensive care unit and the like, and medication status, based on instructions from the user via the input 250, and classifies medical practitioner information according to clinical department and years of experience.

Next, the control unit 210 analyzes the relationship between the subject information and the degree of divergence for each category classified in step S105 (step S106). The degree of divergence calculated in step S104 is used. For example, the control unit 210 obtains and analyzes the median value and the 95% confidence interval of the degree of divergence for each category (FIG. 6A).

After that, the control unit 210 outputs the analysis information analyzed in step S106 (step S107) and ends the process. The control unit 210 outputs the analysis information by causing the display 240 to display the screen illustrated in FIG. 6A, for example.

[Effects of Central Monitor 200 and Information Processing System 1]

In the central monitor 200 and the information processing system 1 of the present embodiment, since the analysis information representing the relationship between the subject information and the magnitude of the degree of divergence is output in this way, a user such as a medical practitioner can check the relationship between at least one of the patient and the medical practitioner, and the degree of divergence. Therefore, it is possible to grasp the tendency of the prediction accuracy of the physiological parameter. This effect will be described below.

For example, when a 72-year-old male patient after heart bypass surgery, i.e., a patient belonging to category 1 of the patient, was admitted to the intensive care unit and there is a disagreement about the date of leaving the intensive care unit between the attending physician (cardiac surgeon) and the intensive care physician, a user such as a medical practitioner can use the analysis information illustrated in FIG. 6A. For example, the attending physician proposes that the patient be discharged from the intensive care unit 24 hours after the reference date and time, and the intensivist care physician proposes that the patient's condition be observed while performing respiratory management in the intensive care unit for 48 hours or more from the reference date and time.

From the analysis information illustrated in FIG. 6A, the user can check the following. For the prediction of ART, cardiac surgeons (category 2) tended to predict low, intensive care physicians (category 3) tended to predict higher, and the variability of predictions (95% confidence interval) was lower for cardiac surgeons. CVP predictions showed no difference in the degree of divergence and variability between cardiac surgeons and intensive care physicians 24 hours after the reference date and time, but the degree of divergence and the variability were greater for cardiac surgeons 72 hours after the reference date and time. The variability of PaO2 predictions is wide for both cardiac surgeons and intensive care physicians 24 hours after the reference date and time, but the variability becomes less 72 hours after the reference date and time. Here, intensive care physicians show slightly less variability. For the prediction of PaCO2, cardiac surgeons had a greater degree of divergence and variability than intensive care physicians 24 hours after the reference date and time, but no difference between cardiac surgeons and intensive care physicians is seen 72 hours after the reference date and time. The central monitor 200 notifies using the display 240, for example, when the magnitude of the degree of divergence exceeds a predetermined value.

From the analysis information illustrated in FIG. 6A, it can be grasped that the prediction accuracy tends to be higher for intensive care physicians than for cardiac surgeons for respiratory conditions (for example, PaO2 and PaCO2) of patients belonging to category 1. Also, for blood pressure (ART), cardiac surgeons show less variability in predictions than intensive care physicians. Therefore, by using the analysis information, the user can easily find an appropriate policy, such as respecting the opinion of the intensive care physician regarding the respiratory management and respecting the opinion of the attending physician (cardiac surgeon) regarding the blood pressure management.

In addition, by deriving the prediction accuracy for each patient category and each medical practitioner category in this way, it becomes easier to find a patient category and a medical practitioner category with high prediction accuracy. For example, by using data of this category with high prediction accuracy as training data, it is possible to use Artificial Intelligence (AI) technology to predict the state of a patient.

In addition, the training such as points of view for changes in physiological parameters can be made to other medical practitioners from medical practitioners belonging to categories with high prediction accuracy and it is possible to effectively improve the prediction accuracy of all medical institutions. In addition, for parameters belonging to the category with low prediction accuracy (for example, medical practitioners), reports on prediction accuracy can be generated automatically or manually, which can be useful for staff training and the improvement of hospital protocols. In addition, it is possible to accumulate predicted values, measured values, and data on the degrees of divergence thereof, and use the accumulated data to improve the analysis algorithm and improve the prediction accuracy.

In addition, by identifying a patient category that tends to have a large degree of divergence, that is, a patient category that is difficult for medical practitioners to predict, medical practitioners can better care for their patients. For example, for patients in such a category, it is possible to prepare more carefully for sudden changes in the patient, or to assign more experienced staff (for example, nurses). In particular, the analysis information can be effectively used in medical settings such as intensive care units where patients of all ages and diseases enter.

In addition, by identifying a patient category that tends to have a smaller degree of divergence, that is, a patient category that can be predicted with relatively high accuracy by medical practitioners, it is possible, for example, to make appropriate staffing decisions within medical institutions. For example, the decision-making authority can be delegated to junior physicians for these categories of patients, and more unpredictable categories of patients can be assigned to senior physicians. Also, depending on the condition of the patient, the task may be delegated from the doctor to a nurse or a pharmacist. In addition, for patients in categories that are extremely difficult to predict, veteran nurses may be assigned, whereby a system may be established that allows assessment by multiple people.

In addition, by comparing the analysis information of each medical institution, it becomes easier to discover bias in the prediction accuracy of each medical institution, and it becomes possible to effectively use the analysis information of other institutions.

As described above, since the central monitor 200 outputs the analysis information representing the relationship between the subject information and the degree of divergence, a user such as a medical practitioner can check the relationship between at least one of the patient and the medical practitioner, and the magnitude of the degree of divergence. Therefore, it is possible to grasp the tendency of the prediction accuracy of the physiological parameter.

Modifications of the information processing system 1 described in the above embodiment will be described below. In the following, to avoid duplication of description, a detailed description of the same configuration as each configuration of the information processing system 1 described in the above embodiment will be omitted.

<Modification 1>

Figure 8:
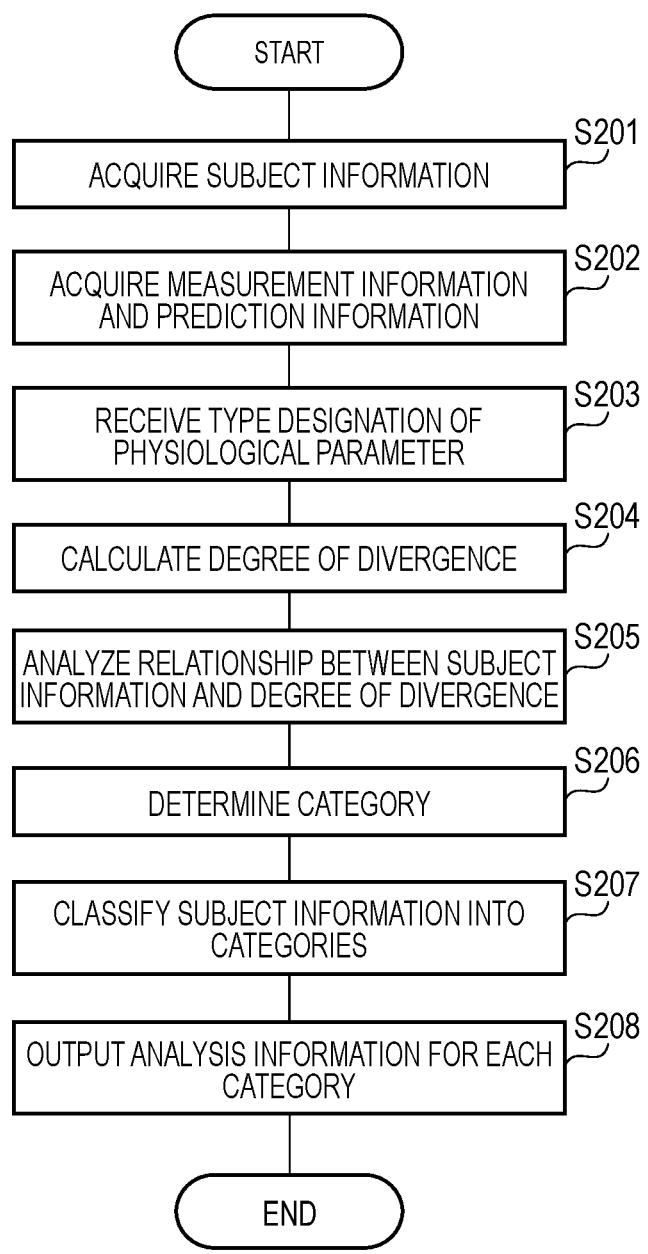
FIG. 8 is a flowchart illustrating an example of central monitor processing according to Modification 1.

FIG. 8 is a flowchart illustrating another example of analysis processing by the control unit 210 described in FIG. 7 above. After analyzing the relationship between the subject information and the degree of divergence (step S205), the control unit 210 determines the category for classifying the subject information (step S206). In this respect, the information processing system 1 according to Modification 1 is different from the information processing system 1 described in the above embodiment.

First, the control unit 210 performs steps S201 to S204 in the same manner as steps S101 to S104 described with reference to FIG. 7 and calculates the degree of divergence. Next, the control unit 210 analyzes the relationship between the subject information and the degree of divergence (step S205).

Next, the control unit 210 determines a plurality of categories based on the relationship between the subject information and the degree of divergence analyzed in step S205 (step S206). In other words, the classification unit 212 determines a plurality of categories based on the relationship between the subject information and the degree of divergence, which was analyzed by the analyzing unit 215. The classification unit 212, for example, finds characteristics of the subject information having a correlation with the magnitude of the degree of divergence and determines a plurality of categories according to these characteristics. The classification unit 212 determines a plurality of categories using, for example, machine learning or statistics.

Next, the control unit 210 classifies each of the plurality of pieces of subject information into the plurality of categories determined in step S206 (step S207). Thereafter, the control unit 210 outputs the analysis information analyzed in step S205 for each category (step S207) and ends the process.

The information processing system 1 having such a central monitor 200 also outputs analysis information representing the relationship between the subject information and the magnitude of the degree of divergence in the same manner as described in the above embodiment, and thus the user such as a medical practitioner can identify the relationship between at least one of the patient and the medical practitioner and the degree of divergence. Therefore, it is possible to grasp the tendency of the prediction accuracy of the physiological parameter.

FIGS. 9A and 9B show an example of analysis information output by the central monitor 200 according to Modification 1. In FIG. 9A, the prediction accuracy is compared for each category of patients with different ages and reasons for admission to the intensive care unit. In FIG. 9B, the prediction accuracy is compared between intensive care physicians and surgeons for each category of patients with different reasons for admission to the intensive care unit. The types of predicted physiological parameters are SpO2, PaO2, PaCO2, PH, etCO2, and RR. In FIGS. 9A and 9B, evaluations A to E are graded evaluations according to the degree of divergence. Evaluation A has the smallest degree of divergence, that is, the prediction accuracy is high, and evaluation E has the highest degree of divergence, that is, the prediction accuracy is low.

From the analysis information illustrated in FIGS. 9A and 9B, a user such as a medical practitioner can grasp the degree of prediction accuracy due to the age of the patient, the reason for the patient for admission to the intensive care unit, and the clinical department of the medical practitioner. In other words, even if the user himself/herself does not know what kind of characteristics of patients and medical practitioners affect the prediction accuracy, the prediction accuracy can be compared for each category of subject information.

<Modification 2>

Figure 10:
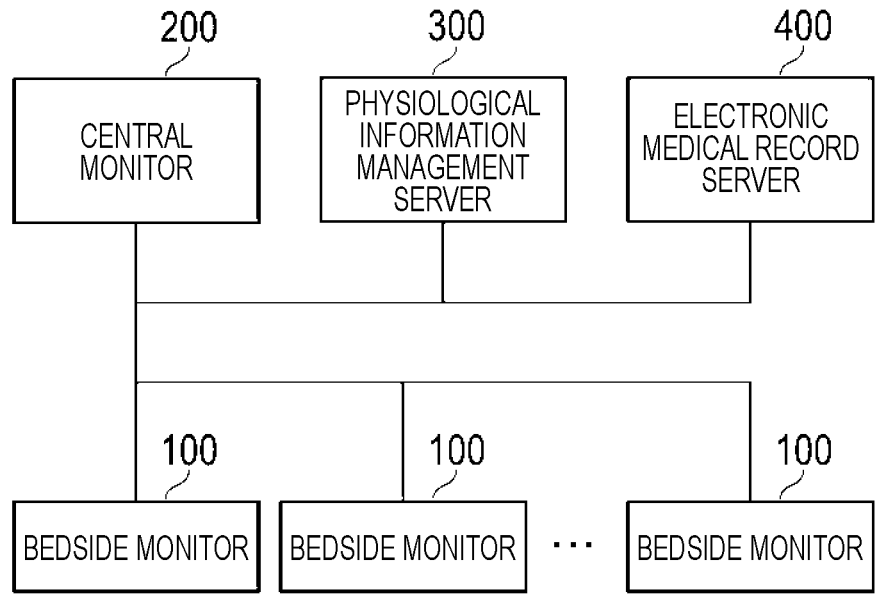
FIG. 10 is a diagram illustrating an example of the overall configuration of an information processing system according to Modification 2.
Figure 11:
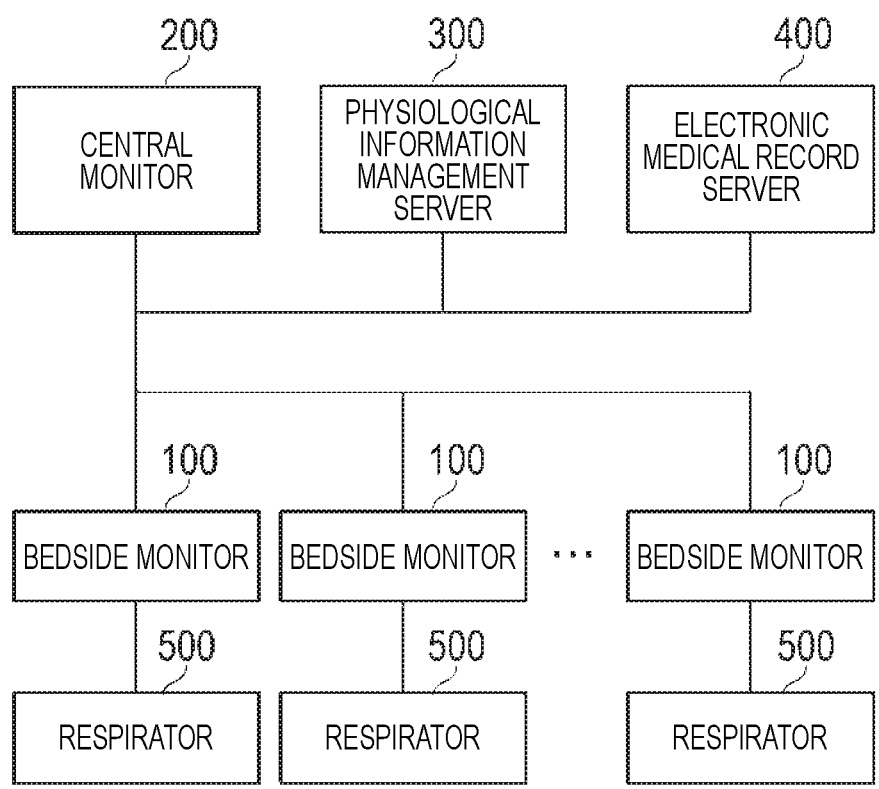
FIG. 11 is a diagram illustrating another example of the overall configuration of the information processing system illustrated in FIG. 10.

FIGS. 10 and 11 are schematic configuration diagrams illustrating another example of the information processing system 1 described with reference to FIG. 1 above. The information processing system 1 may further include a physiological information management server 300 and an electronic medical record server 400 (FIG. 10) and may further include a respirator 500 (FIG. 11).

The physiological information management server 300 and the electronic medical record server 400 are connected to the bedside monitor 100 and the central monitor 200 via a wired or wireless network. A plurality of central monitors 200 may be connected to the physiological information management server 300 and the electronic medical record server 400.

The physiological information management server 300 acquires and stores, for example, measurement information regarding the patient's physiological parameters measured by each bedside monitor 100. The physiological information management server 300 may have the functions of the acquisition unit 211, the classification unit 212, the type designation unit 213, the calculation unit 214, the analyzing unit 215, and the output 216 of the central monitor 200 described in the above embodiment. That is, the physiological information management server 300 may be a specific example of the information processing device of the presently disclosed subject matter. Any device (not illustrated) that relays communication between devices may be included as appropriate, and the relay device may appropriately convert transmission data.

The electronic medical record server 400 stores electronic medical record information of a plurality of patients. The electronic medical record server 400 transmits patient information to the physiological information management server 300, for example.

The respirator 500 is a so-called artificial respirator and is connected to each bedside monitor 100. The respirator 500 may be connected to the central monitor 200, the physiological information management server 300, and the electronic medical record server 400 so as to be able to directly communicate with each other. The physiological parameters measured by the respirator 500, settings of the respirator 500, alarm information of the respirator 500, and the like are transmitted to the physiological information management server 300. The respirator 500 may function similarly to the input 250 of the central monitor 200 described above. The information processing system 1 may have a measuring device such as a blood gas measuring device and a spot check monitor in addition to the respirator 500, and a measuring device for measuring other physiological parameters may be used instead of the respirator 500.

As described in the above embodiment, such an information processing system 1 also outputs the analysis information representing the relationship between the subject information and the magnitude of the degree of divergence, and therefore, a user such as a medical practitioner can check the relationship between at least one of the patient and the medical practitioner, and the degree of divergence. Therefore, it is possible to grasp the tendency of the prediction accuracy of the physiological parameter.

Although the embodiments of the presently disclosed subject matter have been described in detail above, the presently disclosed subject matter is not limited to the above-described embodiments. For example, some or all of the functions implemented by the programs in the above-described embodiments may be implemented by hardware such as circuits.

Also, the control unit 210 described above may not have all the functions and may have other functions. Some or all of the functions of the acquisition unit 211, the classification unit 212, the type designation unit 213, the calculation unit 214, the analyzing unit 215, and the output 216 of the control unit 210 described above may be provided in the physiological information management server 300 or the electronic medical record server 400.

In addition, the physiological information management server 300, the electronic medical record server 400, or the respirator 500 may function similarly to part or all of the control unit 210, the memory 220, the communication unit 230, the display 240, and the input 250 of the central monitor 200 described above.

In the above-described embodiment, the central monitor 200 corresponds to a specific example of the information processing device of the presently disclosed subject matter, but the bedside monitor 100 may correspond to a specific example of the information processing device of the presently disclosed subject matter. For example, the control unit 110 of the bedside monitor 100 may function similarly to the control unit 210 described above. Both the bedside monitor 100 and the central monitor 200 may correspond to a specific example of the information processing device of the presently disclosed subject matter.

In addition, some steps may be omitted from the flowchart described above, and other steps may be added. Also, part of each step may be executed simultaneously, or one step may be divided into a plurality of steps and executed. Furthermore, the order of each step may be different. For example, the process of step S103 may be performed before the process of step S102 of FIG. 7.

In the information processing device according to the presently disclosed subject matter, the relationship between the subject information and the magnitude of the degree of divergence between the prediction information and the measurement information is analyzed, and the analysis information is output. Therefore, a user such as a medical practitioner can identify the relationship between at least one of the patient and the medical practitioner and the degree of divergence and can grasp the tendency of the prediction accuracy of the physiological parameter.

What is claimed is:

1. An information processing device comprising:
   a controller configured to:
      acquire:
         subject information including at least one of information about a patient and information about a medical practitioner,
         measurement information about a physiological parameter of the patient, and
         prediction information about the physiological parameter of the patient predicted by the medical practitioner;
      calculate a degree of divergence between the prediction information and the measurement information at a predetermined point in time,
      analyze a relationship between the subject information and the degree of divergence between the prediction information and the measurement information; and
      output analysis information representing the relationship between the subject information and the degree of divergence.

2. The information processing device according to claim 1, wherein:
   the prediction information includes first prediction information after a first time from a reference date and time and second prediction information after a second time from the reference date and time,
   the measurement information includes first measurement information measured after the first time and second measurement information measured after the second time from the reference date and time, and
   the controller is configured to analyze a relationship between the subject information and a first degree of divergence between the first prediction information and the first measurement information and analyzes a relationship between the subject information and a second degree of divergence between the second prediction information and the second measurement information.

3. The information processing device according to claim 1, wherein the controller is configured to classify the subject information into a plurality of categories.

4. The information processing device according to claim 3, wherein the controller is configured to analyze the relationship between the subject information and the degree of divergence for each category.

5. The information processing device according to claim 4, wherein the controller is configured to determine the plurality of categories based on an instruction from a user.

6. The information processing device according to claim 3, wherein the controller is configured to:
   determine the plurality of categories based on the relationship between the subject information and the degree of divergence, which was analyzed by the controller, and
   output the analysis information for each category.

7. The information processing device according to claim 1, wherein the controller is configured to:
   designate a type of the physiological parameter, and
   analyze the relationship between the subject information and the degree of divergence between the prediction information and the measurement information regarding the type of the physiological parameter designated by the controller.

8. The information processing device according to claim 1, wherein the degree of divergence is a difference between the prediction information and the measurement information.

9. The information processing device according to claim 1, wherein the analysis information includes information regarding a confidence interval of the degree of divergence.

10. The information processing device according to claim 1, wherein the analysis information includes information on graded evaluation according to the degree of divergence.

11. The information processing device according to claim 1, further comprising:
    a physiological sensor configured to acquire subject information about the patient, and
    a display configured to display analysis information.

12. An information processing method comprising:
    acquiring subject information including at least one of information about a patient and information about a medical practitioner, measurement information about a physiological parameter of the patient, and prediction information about the physiological parameter of the patient predicted by the medical practitioner;
    calculating a degree of divergence between the prediction information and the measurement information at a predetermined point in time;
    analyzing a relationship between the subject information and the degree of divergence between the prediction information and the measurement information; and
    outputting analysis information representing the relationship between the subject information and the degree of divergence.

13. The information processing method according to claim 12,
    wherein the subject information about the patient is acquired by a physiological sensor, and
    wherein the analysis information is displayed on a display.

14. A non-transitory computer-readable storage medium that stores a program causing a computer to execute steps of:
    acquiring subject information including at least one of information about a patient and information about a medical practitioner, measurement information about a physiological parameter of the patient, and prediction information about the physiological parameter of the patient predicted by the medical practitioner;
    calculating a degree of divergence between the prediction information and the measurement information at a predetermined point in time;
    analyzing a relationship between the subject information and the degree of divergence between the prediction information and the measurement information; and
    outputting analysis information representing the relationship between the subject information and the degree of divergence.

15. The information processing method according to claim 14,
    wherein the subject information about the patient is acquired by a physiological sensor, and
    wherein the analysis information is displayed on a display.

* * * * *